United States Patent Office 2,773,541
Patented Dec. 11, 1956

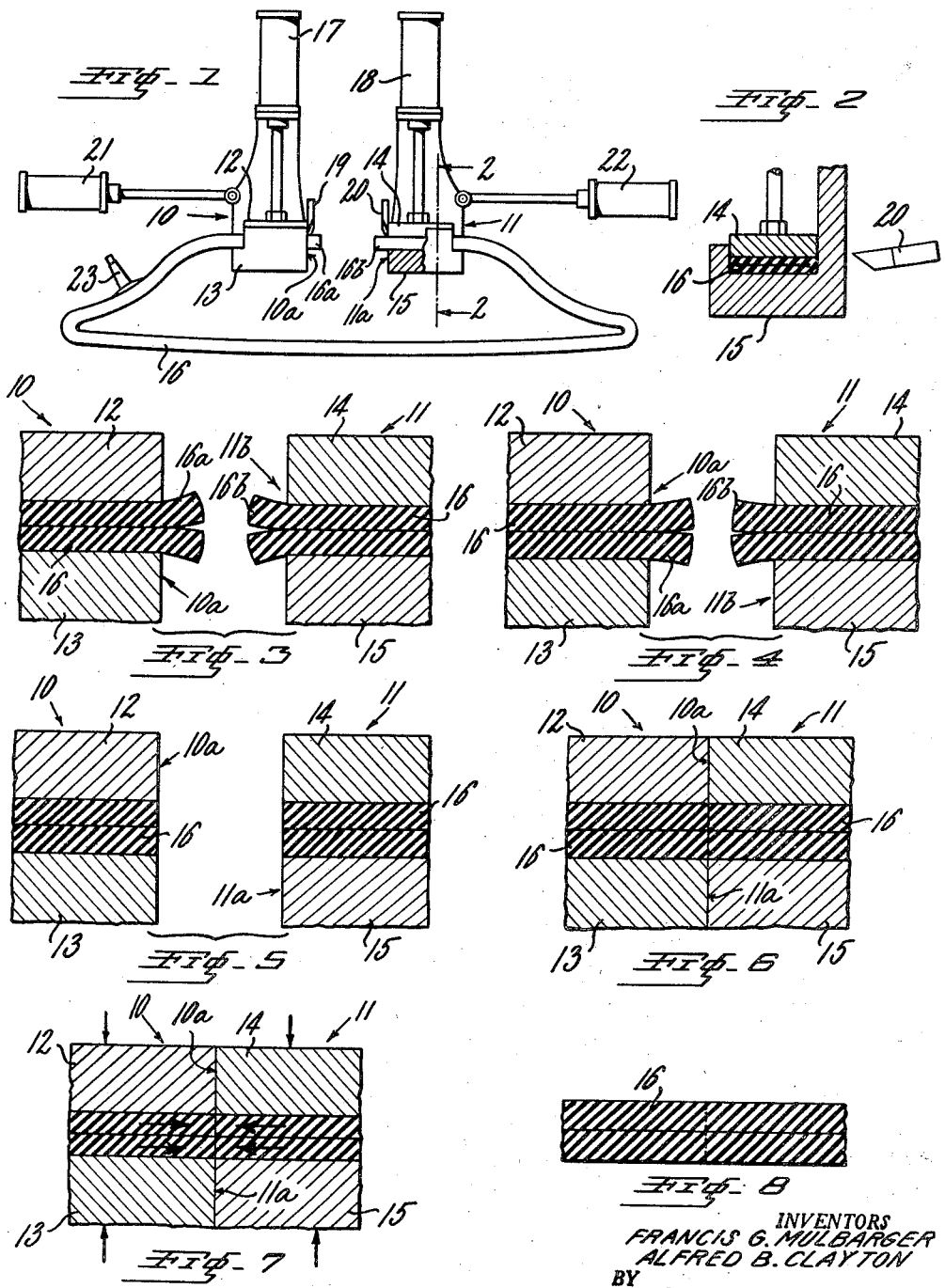

2,773,541

METHOD OF SPLICING RUBBER ARTICLES

Francis A. Mulbarger and Alfred B. Clayton, Indianapolis, Ind., assignors to United States Rubber Company, New York, N. Y., a corporation of New Jersey Application May 20, 1954, Serial No. 431,092

10 Claims. (Cl. 154—14)

This invention relates to a method of splicing rubber articles and, in particular, it relates to a method of splicing together the ends of a length of tubular inner tube stock in butt relationship to form an inner tube.

The primary object of the invention is to provide a method of effectively butt splicing rubber articles and in particular tubular inner tube stock, without the formation of undesirable flash or rind around the splice.

In accordance with the invention, the end portions of the rubber article to be spliced are separately gripped between opposed surfaces of separate clamps with extreme end portions thereof extending from the faces of the clamps. The extending end portions are then trimmed or severed flush with the faces of the clamps and the clamps move together until the end faces of the clamps are in abutting engagement and the severed ends of the rubber article in alignment. While the end faces of the clamps are in abutting engagement, the pressure applied by the opposed clamping surfaces of the clamps on the clamped end portions of the rubber article is materially increased so that the aligned severed ends are forced into tight abutting engagement to effect a splice thereof by the extrusion pressure created in the end portions of the article by the increased clamping pressure. The increased clamping pressure or force for effecting the splice being applied only when the faces of the clamps are in abutting engagement and the severed ends being flush with the faces of the clamps prior to their abutting engagement, no flash or rind is formed around the splice as the two clamps together completely confine the severed ends of the rubber article and there is no place for flash or rind to form when the splicing force or pressure is applied.

This is in contrast to methods heretofore used, in which end portions of the article always extended or projected beyond the faces of the clamps prior to movement of the clamps together, and flash or rind was necessarily formed as the extending portions were forced together to effect the splice by movement together of the clamps, unless the shape and volume of the extending portions were carefully controlled so as to provide no excess of material as in U. S. Patent No. 2,550,566.

The invention, its objects, and advantages having been broadly described above, a more detailed description is given hereafter by reference to the accompanying drawings, wherein:

Fig. 1 is a diagrammatic elevational view of apparatus for forming a splice in accordance with the present invention;

Fig. 2 is a transverse view of a portion of the apparatus taken on the line 2—2 of Fig. 1;

Fig. 3 is an enlarged sectional view of a portion of the inner tube stock and the clamping jaws, showing the stock initially clamped at a comparatively high pressure to seat the jaws effectively against the inner tube stock and to adjust and equalize gauge irregularities in the stock prior to severing or trimming the projecting end portions;

Fig. 4 is an enlarged sectional view similar to that of Fig. 3 showing the clamping pressure reduced prior to severing the projecting end portions of the inner tube stock;

Fig. 5 is an enlarged sectional view, similar to that of Fig. 4, but showing the extending end portions of the inner tube stock severed flush with the opposed faces of the clamps;

Fig. 6 is an enlarged sectional view, similar to that of Fig. 5, but showing the clamps moved together to bring the faces thereof into abutting engagement and the severed ends of the inner tube stock into alignment;

Fig. 7 is an enlarged sectional view similar to that of Fig. 6, showing the clamps and tube stock after the pressure of the clamps has been increased to force the severed ends into tight abutting engagement to effect the splice; the vertical arrows indicating the direction of the increase in pressure on the clamps and the horizontal arrows indicating the direction of the extrusion pressure created in the ends of the stock for effecting the splice; and Fig. 8 is a sectional view of the inner tube stock showing the splice effected and the clamps removed.

Referring to the drawings and in particular to Fig. 1, there is diagrammatically shown a typical apparatus useful in performing the splicing method of the invention.

The apparatus includes two clamps 10 and 11, provided respectively with upper and lower clamping jaws 12 and 13 and upper and lower clamping jaws 14 and 15, between the opposed surfaces of which end portions of a section of inner tube stock 16 to be spliced may be separately clamped. Vertical movement of the upper jaw 12 of the clamp 10 toward and away from the lower jaw 13 to provide the clamping action is effected by a fluid actuated cylinder 17, the piston rod of which is attached to the upper jaw 12. Vertical movement of the upper jaw 14 of the clamp 11 is similarly effected by a fluid actuated cylinder 18. Horizontally movable knives 19 and 20, adapted to move between the clamps 10 and 11, serve to trim extending or projecting end portions 16a and 16b of the stock 16 extending from opposed faces 10a and 11a of the clamps 10 and 11 flush with the faces 10a and 11a. The knives 19 and 20 may be heated to increase their cutting efficiency and to heat the severed ends of the stock to render them more "sticky" or "tacky." Fluid actuated cylinders 21 and 22, connected respectively by means of their piston rods to clamps 10 and 11, serve to move the clamps 10 and 11 to bring the faces 10a and 11a into abutting engagement. The faces 10a and 11a of the clamps are of mating contour so that when in abutting engagement substantially no clearance is provided between them, and lateral flow of stock is thereby prevented.

It will be appreciated that the apparatus for practicing the invention may be of various forms and that the apparatus diagrammatically shown and described above is merely for the purpose of illustration. The splicing apparatus shown in U. S. Patent No. 2,660,216, is particularly useful for practicing the invention, as only slight changes in the timing mechanism thereof need be made in order to adapt it for practicing the invention.

In accordance with the invention, end portions of a length of tubular, uncured, rubber inner tube stock 16 are separately clamped between jaws 12, 13 of clamp 10 and jaws 14, 15 of clamp 11, with extreme end portions 16a and 16b, thereof, extending from opposed faces 10a and 11a of the clamps 10 and 11, as best shown in Fig. 1. A suitable valve stem 23 may be applied to the inner tube stock 16 prior to the splicing thereof if desired.

Preferably, the end portions of the inner tube stock 16 are initially subjected to a comparatively high pressure, in the range of 21 to 107 pounds per square inch.

The tube stock 16 is shown subjected to this comparatively high pressure in Fig. 3. The pressure is varied depending upon the particular rubber stock being spliced. For example, it has been found that for stock of butyl (rubbery copolymer of isobutylene and isoprene) a pressure of approximately 90 pounds per square inch is satisfactory; for stock of natural rubber, a pressure of approximately 34 pounds per square inch has been found to be satisfactory. The tube stock is held in this clamped position and under this pressure for a period of approximately two seconds after which the pressure is considerably reduced during the severing or trimming operation. The purpose of this variation in pressure is to provide a high initial squeeze or pressure on the inner tube stock so that the jaws of the clamps 10 and 11 will seat effectively against the inner tube stock and adjust and equalize gauge irregularities of the inner tube stock prior to severing or trimming the projecting end portions.

After the duration of the higher pressure, the tube is clamped at a lower pressure sufficient to hold it in place without excessive distortion while the end portions 16a and 16b are severed or trimmed. The pressure on the inner tube stock 16 during the cutting operation may range from 10 to 50 pounds per square inch. The inner tube stock 16 under this pressure is shown in Fig. 4.

While the inner tube stock 16 is maintained clamped at this lower pressure, the projecting or extending end portions 16a and 16b are severed flush with the end faces 10a and 11a of the clamps 10 and 11 as shown in Fig. 5, and the clamps 10 and 11 move together until the end faces 10a and 11a thereof are in abutting engagement and the severed ends of the inner tube stock 16 are in alignment, as shown in Fig. 6. The severed ends of the stock 16, prior to movement together of the clamps, may be heated by using heated knives or by separate heating means to increase the tackiness thereof. It will be appreciated that the severed ends of the stock 16 being flush with the end faces 10a and 11a of the clamps 10 and 11 prior to the engagement of the faces of the clamps 10 and 11, substantially no joining pressure is provided between the severed end surfaces of the stock 16 and accordingly substantially no splicing of the severed ends is effected as the faces of the clamps are moved into abutting engagement. For the same reason, there is no extrusion or flow of stock laterally to form undesirable flash or rind as the clamps are moved together, as would be the case if portions of the stock extended from the faces of the clamps.

Pressure for joining the tacky severed ends of the stock 16 is provided by materially increasing the clamping pressure applied by the clamps 10 and 11 in the direction indicated by the vertical arrows in Fig. 7. This sets up an extrustion pressure or force within the clamped ends of the stock 16 acting in the direction of the horizontal arrows in Fig. 7, which forces the tacky severed ends of the stock into tight abutting engagement to effect the splicing thereof. It will be noted that the splicing pressure being applied only when the faces of the clamps are in abutting engagement, the clamps confine the severed ends and prevent the formation of undesirable flash or rind as the severed ends are forced into abutting engagement by extrusion pressure to form the splice. Accordingly, the splice effected is rindless or flashless as shown in Fig. 8. This increased pressure on the clamps for effecting the splicing of the stock 16, may range from 100 to 375 pounds per square inch, higher pressures being used with butyl stock and lower pressures with natural rubber. This pressure is maintained for a period of from 3 to 8 seconds. It will be appreciated that the force holding the faces of the clamps 10 and 11 in abutting engagement must be equal to or in excess of that of the extrusion force effecting the splice of the severed ends, to thereby prevent separation of the faces of the clamps during the splicing operation.

In certain instances, and in particular in splicing heavy tube stock, it may be desirable to make a second cut after the first cut, prior to moving the clamps into abutting engagement, in order to insure that the severed ends of the stock 16 are straight and flush with the faces of the clamps.

This is best accomplished by again increasing the pressure on the ends of the stock briefly to the magnitude initially applied to extrude any stock which may have previously been trimmed irregularly as a result of the weight of the extending or projecting trim portions 16a and 16b, tube stresses, or gauge variations, and then reducing the pressure on the end portions to a magnitude sufficient to hold them in place without excessive distortion, and again severing any stock projecting from the faces of the clamps. The clamps 10 and 11 are then moved together to bring the faces of the clamps into abutting engagement and the severed, tacky ends spliced together by extrusion pressure as described previously.

From the above description, it can be seen that there is provided a novel method of butt splicing rubber articles, and in particular rubber inner tube stock, without the formation of undesirable flash or rind around the splice. In addition to eliminating the formation of flash or rind, it has also been found that the splices formed in accordance with the present invention have an average strength approximately 25% greater than those made by conventional methods.

While reference has been made to rubber as the material composition of the inner tube stock, it is to be understood that the term is used generally to include natural rubber, synthetic rubber, or combinations thereof.

Having thus described our invention, what we claim and desire to protect by Letters Patent is:

1. The method of splicing rubber articles comprising, separately gripping end portions of the articles with extreme end portions thereof extending from the faces of the gripping means, severing the extending portions substantially flush with the faces of the gripping means, moving said faces of said gripping means into abutting engagement with the severed ends of the articles in alignment to thereby completely confine said ends, thereafter while the faces of said gripping means are in engagement increasing the gripping pressure on the ends of said articles to cause said aligned severed ends to be forced into tight abutting relationship to form a splice by extrusion pressure created therein by the increase in said gripping pressure, and thereafter releasing the gripping means.

2. The method of splicing rubber articles comprising, gripping end portions of the articles to be spliced with the extreme ends thereof to be spliced substantially flush with the faces of the gripping means, moving said end faces of the gripping means into abutting engagement with the extreme end surfaces of said articles in alignment to thereby completely confine said end surfaces, thereafter increasing the gripping pressure on said end portion to force said extreme end surfaces into tight abutting engagement by extrusion pressure created by the increased gripping pressure to form a splice, and thereafter releasing the gripping means.

3. The method of splicing together the ends of a length of tubular rubber stock comprising, separately gripping each end portion of a length of flattened inner tube stock with extreme end portions thereof extending from the faces of the gripping means, severing the extending portions substantially flush with the faces of the gripping means, moving said faces of said gripping means into abutting engagement with the severed ends of the articles in alignment to thereby completely confine said severed ends, thereafter while the faces of said gripping means are in engagement increasing the gripping pressure on the end portions of said articles to cause said aligned severed ends to be forced into tight abutting relationship to form a splice by extrusion pressure created therein by the increased gripping pressure, and thereafter releasing the gripping means.

4. The method of splicing together the ends of a length of tubular rubber stock comprising, separately gripping each end portion of a length of flattened tubular stock with extreme end portions thereof extending from the faces of the gripping means, by the application of pressure to the flattened surfaces of the tube, severing the extending portions substantially flush with the gripping means, moving said faces of the gripping means into abutting engagement with the severed ends of the stock in alignment to thereby completely confine said severed ends, thereafter while the faces of said gripping means are in engagement increasing the gripping pressure on the end portions of said stock to cause said aligned severed ends to be forced into tight abutting relationship to form a splice by extrusion pressure created therein by the increase in said gripping pressure, and thereafter releasing the gripping means.

5. The method of splicing together the ends of a length of tubular stock to form an inner tube comprising, separately gripping each end portion of a length of flattened tubular stock by the application of pressure to the flattened surface of the stock, allowing a portion of the ends of the stock to project beyond the faces of the gripping means, reducing the gripping pressure applied to the stock, severing the projecting portions substantially flush with the faces of the gripping means, moving the faces of said gripping means into abutting engagement with the severed ends of the stock in alignment to thereby completely confine said severed ends, thereafter while the faces of said gripping means are in engagement increasing the gripping pressure on the end portions of said stock to cause said aligned severed ends to be forced into tight abutting relationship to form a splice by extrusion pressure created therein by the increase in said gripping pressure, and thereafter releasing said gripping means.

6. The method of splicing together the ends of a length of tubular stock comprising, separately gripping each end portion of a length of flattened tubular stock by the application of pressure against the flattened surface of the stock to the extent of from 21 to 107 pounds per square inch, allowing a portion of the ends of the stock to project beyond the gripping means, reducing the gripping pressure applied to the stock, severing the projecting portions substantially flush with the faces of the gripping means, moving the faces of said gripping means into abutting engagement with the severed ends of the stock in alignment to thereby completely confine said severed ends, thereafter while the faces of said gripping means are in engagement increasing the gripping pressure on the end portions of said stock to cause said aligned severed ends to be forced into tight abutting relationship to form a splice by the extrusion pressure created therein by the increase in said gripping pressure, thereafter releasing said gripping means.

7. The method of splicing together the ends of a length of tubular stock comprising, separately gripping each end portion of a length of flattened tubular stock by the application of pressure against the flattened surface of the stock to the extent of from 21 to 107 pounds per square inch, allowing a portion of the ends of the stock to project beyond the faces of the gripping means, reducing the gripping pressure applied to the stock to approximately 10 to 50 pounds per square inch, severing the projecting portions substantially flush with the gripping means, moving said faces of said gripping means into abutting engagement with the severed ends of the stock in alignment to thereby completely confine said severed ends, thereafter while the faces of said gripping means are in engagement increasing the gripping pressure of the end portions of said stock to cause said aligned severed ends to be forced into tight abutting relationship by the extrusion pressure created therein by the increase in said gripping pressure to thereby form a splice, and thereafter releasing said gripping means.

8. The method of splicing together the ends of a length of tubular stock comprising, separately gripping each end portion of a length of flattened tubular stock, allowing a portion of the ends of the stock to project beyond the faces of the gripping means, severing the projecting portions substantially flush with the faces of the gripping means, moving said faces of said gripping means into abutting engagement with the severed ends of the stock in alignment to thereby completely confine said severed ends, thereafter while the faces of said gripping means are in engagement increasing the gripping pressure of the end portions of said inner tube stock to from 100 to 375 pounds per square inch to cause said aligned severed ends of the inner tube stock to be forced into tight abutting relationship by extrusion pressure created therein by the increase in said gripping pressure to thereby form a splice, and thereafter releasing said gripping means.

9. The method of splicing together the ends of a length of tubular stock comprising, separately gripping each end portion of a length of flattened tubular stock by the application of pressure against the flattened surface of the stock to the extent of from 21 to 107 pounds per square inch, allowing a portion of the ends of the stock to project beyond the gripping means, reducing the gripping pressure applied to the stock to approximately 10 to 50 pounds per square inch, severing the projecting portions substantially flush with the faces of the gripping means, moving said faces of said gripping means into abutting engagement with the severed ends of the inner tube stock in alignment to thereby completely confine said severed ends, and thereafter while the faces of said gripping means are in engagement increasing the gripping pressure on the ends of said inner tube stock to from 100 to 375 pounds per square inch to cause said aligned severed ends of said stock to be forced into tight abutting relationship by the extrusion pressure created therein by said increase in said gripping pressure to thereby form a splice, and thereafter releasing said gripping means.

10. The method of splicing together two ends of a length of tubular rubber stock comprising, separately gripping each end portion of the stock with extreme end portions thereof extending from the faces of the gripping means, reducing the gripping pressure applied to the end portions of the stock, severing the projecting portions substantially flush with the faces of the gripping means, increasing the gripping pressure of the stock, reducing the gripping pressure of the stock, severing any material extending from the faces of the gripping means, moving said faces of said gripping means into abutting engagement with the severed ends of the tubular stock in alignment to thereby completely confine said severed ends, thereafter while the faces of said gripping means are in engagement increasing the gripping pressure on the ends of said tubular stock to cause said aligned severed ends to be forced into tight abutting relationship by extrusion pressure created therein by the increase in said gripping pressure to thereby form a splice, and thereafter releasing the gripping means.

References Cited in the file of this patent

UNITED STATES PATENTS

| | | |
|---|---|---|
| 2,550,566 | Iknayan et al. | Apr. 24, 1951 |
| 2,660,216 | Clayton et al. | Nov. 24, 1953 |